US010101477B2

(12) United States Patent
Berron et al.

(10) Patent No.: US 10,101,477 B2
(45) Date of Patent: Oct. 16, 2018

(54) SYSTEM AND METHOD FOR PERFORMING SEISMIC EXPLORATION WITH MULTIPLE ACQUISITION SYSTEMS

(71) Applicant: CGG Services SA, Massy (FR)

(72) Inventors: Cécile Berron, Massy (FR); Philippe Herrmann, Massy (FR); Julien Cotton, Massy (FR); Eric Forgues, Massy (FR); John J. Sallas, Plano, TX (US)

(73) Assignee: CGG SERVICES SAS, Massy (FR)

( * ) Notice: Subject to any disclaimer, the term of this patent is extended or adjusted under 35 U.S.C. 154(b) by 145 days.

(21) Appl. No.: 15/105,035

(22) PCT Filed: Dec. 5, 2014

(86) PCT No.: PCT/IB2014/003072
§ 371 (c)(1),
(2) Date: Jun. 16, 2016

(87) PCT Pub. No.: WO2015/092540
PCT Pub. Date: Jun. 25, 2015

(65) Prior Publication Data
US 2016/0313460 A1    Oct. 27, 2016

Related U.S. Application Data

(60) Provisional application No. 61/916,816, filed on Dec. 17, 2013.

(51) Int. Cl.
*G01V 1/00* (2006.01)
*G01V 1/30* (2006.01)

(52) U.S. Cl.
CPC .............. *G01V 1/006* (2013.01); *G01V 1/005* (2013.01); *G01V 1/301* (2013.01);
(Continued)

(58) Field of Classification Search
CPC ........ G01V 1/005; G01V 1/006; G01V 1/301; G01V 2210/612; G01V 2210/14; G01V 2210/12; G01V 2210/74
See application file for complete search history.

(56) References Cited

U.S. PATENT DOCUMENTS 3,629,801 A    12/1971  Brede
6,714,867 B2    3/2004  Meunier
(Continued)

FOREIGN PATENT DOCUMENTS

WO    2001/059481    8/2001

*Primary Examiner* — Krystine E Breier
(74) *Attorney, Agent, or Firm* — Patent Portfolio Builders PLLC (57) ABSTRACT

A system and method for performing seismic exploration with multiple acquisition systems is disclosed. The method includes configuring a first seismic source located outside of an exclusion zone and configuring a second seismic source located inside of the exclusion zone. The method further includes obtaining a first seismic dataset corresponding to a first seismic signal emitted by the first seismic source and obtaining a second seismic dataset corresponding to a second seismic signal emitted by the second seismic source. The method further includes combining the first and second datasets to create a complete dataset covering a survey area and creating a seismic image of a subsurface of the survey area.

20 Claims, 4 Drawing Sheets

(52) U.S. Cl.
CPC ...... *G01V 2210/12* (2013.01); *G01V 2210/14* (2013.01); *G01V 2210/612* (2013.01); *G01V 2210/74* (2013.01)

(56) References Cited

U.S. PATENT DOCUMENTS

| | | |
|---|---|---|
| 7,420,879 B2 | 10/2008 | Meynier et al. |
| 7,859,945 B2 | 12/2010 | Sallas et al. |
| 8,619,497 B1 | 12/2013 | Sallas et al. |
| 2011/0032795 A1* | 2/2011 | Kragh ................ G01V 1/32 367/21 |
| 2012/0155217 A1* | 6/2012 | Dellinger ............ G01V 1/005 367/38 |
| 2014/0022860 A1* | 1/2014 | Van Borselen ...... G01V 1/364 367/24 |
| 2014/0254313 A1* | 9/2014 | Dowle ................ G01V 1/137 367/15 |
| 2015/0117149 A1* | 4/2015 | Edme ................. G01V 1/24 367/37 |

* cited by examiner

Fig. 3

SYSTEM AND METHOD FOR PERFORMING SEISMIC EXPLORATION WITH MULTIPLE ACQUISITION SYSTEMS

CROSS-REFERENCED TO RELATED APPLICATIONS

This application is a U.S. National Stage Application of International Application No. PCT/IB2014/003072 filed Dec. 5, 2014, which designates the United States, and which claims the benefit under 35 U.S.C. § 119(e) of U.S. Provisional Application Ser. No. 61/916,816, filed on Dec. 17, 2013, entitled "Simultaneous Seismic Acquisition Methods," which are incorporated by reference in their entirety for all purposes.

TECHNICAL FIELD

The present disclosure relates generally to seismic exploration tools and processes and, more particularly, to systems and methods for performing seismic exploration with multiple acquisition systems.

BACKGROUND

In the oil and gas industry, geophysical survey techniques are commonly used to aid in the search for and evaluation of subterranean hydrocarbon or other mineral deposits. Generally, a seismic energy source, or "seismic source," generates a seismic signal that propagates into the earth and is partially reflected by subsurface seismic interfaces between underground formations having different acoustic impedances. The reflections are recorded by seismic detectors, or "receivers," located at or near the surface of the earth, in a body of water, or at known depths in boreholes, and the resulting seismic data can be processed to yield information relating to the location and physical properties of the subsurface formations. Seismic data acquisition and processing generates a profile, or image, of the geophysical structure under the earth's surface. While this profile may not directly show the location for oil and gas reservoirs, those trained in the field can use such profiles to more accurately predict the location of oil and gas, and thus reduce the chance of drilling a non-productive well.

Various sources of seismic energy have been used to impart the seismic waves into the earth. Such sources have included two general types: 1) impulsive energy sources and 2) seismic vibrator sources. The first type of geophysical prospecting utilizes an impulsive energy source, such as dynamite, a mud gun, or a marine air gun, to generate the seismic signal. With an impulsive energy source, a large amount of energy is injected into the earth in a very short period of time. In the second type of geophysical prospecting, a vibrator is used to propagate energy signals over an extended period of time, as opposed to the near instantaneous energy provided by impulsive sources.

The seismic process employing such use of a seismic vibrator, sometimes referred to as "vibroseis," propagates energy signals into the earth over an extended period of time or "sweep." In such instances, energy at a starting frequency is first imparted into the earth, and the vibration frequency changes over the sweep interval at some rate until the stopping frequency is reached at the end of the interval. The difference between the starting and stopping frequencies of the sweep generator is known as the "sweep frequency range," and the amount of time used to sweep through those frequencies is known as the "sweep length." The recorded data may then be correlated to convert the extended seismic source signal into an impulse. In land-based implementations, the seismic source signal is generally generated by a servo-controlled hydraulic vibrator, or "shaker unit," mounted on a mobile base unit. In marine implementations, vibrators typically include a bell-shaped housing with a large and heavy diaphragm in its open end. The vibrator is lowered into the water from a marine survey vessel, and the diaphragm is vibrated by a hydraulic drive system similar to that used in a land vibrator. In some instances, a seismic sweep may be a bandlimited pseudorandom signal or "pseudorandom sweep" where the phase of the signal may be pseudorandom. The use of pseudorandom sweeps may allow multiple seismic sources to operate at the same time without interference. Pseudorandom sweeps are described in U.S. Pat. No. 7,859,945, incorporated in material part by reference herein.

A seismic signal may be also generated by a SEISMOVIE™ system designed and manufactured by CGG Services SA (Massy, France). A SEISMOVIE™ system may emit energy at individual frequencies, one-by-one, until approximately the entire frequency band is emitted. While a SEISMOVIE™ system does not perform a sweep, a frequency band from the starting frequency to the stopping frequency may still be emitted to create an essentially complete discrete frequency dataset. Except where expressly stated herein, "seismic source" is intended to encompass any seismic source implementation, both impulse and vibratory, including any dry land, transition zone, or marine implementations thereof.

The seismic signal is emitted in the form of a wave that is reflected off interfaces between geological layers. The reflected waves are received by an array of geophones, or receivers, located at or near the earth's surface, which convert the displacement of the ground resulting from the propagation of the waves into an electrical signal recorded by means of recording equipment. The receivers typically receive data during the seismic source's sweep interval and during a subsequent "listening" interval. The receivers record the particle motion or pressure in the medium (for example soil, rock, or water) at their location. The received signals can be processed to estimate the travel time from the seismic source to the receiver. Travel time, in combination with velocity information, can be used to reconstruct the path of the waves to create an image of the subsurface.

A large amount of data may be received by the receivers and the received signals may be recorded and subjected to signal processing before the data is ready for interpretation. The recorded seismic data may be processed to yield information relating to the location of the subsurface reflectors and the physical properties of the subsurface formations. That information is then used to generate an image of the subsurface.

In some circumstances, transporting, installing, or using a seismic source in some locations may not be feasible. Specifically, seismic signals propagated into the earth may have sufficient energy to pose a physical hazard, environmental hazard, or nuisance to surrounding areas. Accordingly, use of seismic sources may be subject to permitting requirements or other restrictions. In other circumstances, safety concerns may identify an area where a conventional seismic source cannot be used. For example, in some marine contexts, exclusion zones may be defined around offshore platforms, floating production, storage and offloading (FPSO) areas, rigs, or buoys.

Due to permitting or safety restrictions in various zones or hard to reach areas, complete seismic source coverage may not be achieved in certain "exclusion zones." Incomplete seismic source coverage can create inaccuracies in the data resulting from the seismic survey and thus, may reduce the accuracy of a seismic image of the subsurface. Additionally, gaps in the seismic source coverage may cause artifacts in the seismic data. An artifact is a distortion in the seismic data that can impair the ability to accurately estimate the subsurface from the seismic data. Accordingly, it would be advantageous to provide systems and methods that provide complete seismic source coverage in exclusions zones.

SUMMARY

In accordance with one embodiment of the present disclosure, a method for performing seismic exploration with multiple acquisition systems is disclosed. The method includes configuring a first seismic source located outside of an exclusion zone, configuring a second seismic source located inside of the exclusion zone, obtaining a first seismic dataset corresponding to a first seismic signal emitted by the first seismic source, obtaining a second seismic dataset corresponding to a second seismic signal emitted by the second seismic source, combining the first and second datasets to create a complete dataset covering a survey area, and creating a seismic image of a subsurface of the survey area.

In accordance with another embodiment of the present disclosure, a seismic exploration system is disclosed. The system includes a first seismic source configured to emit a first seismic signal. The first seismic source located outside of an exclusion zone. The system additionally includes a second seismic source configured to emit a second seismic signal. The second seismic source located inside of an exclusion zone. The system further includes a data processing system configured to obtain a first seismic dataset corresponding to the first seismic signal emitted by the first seismic source, obtain a second seismic dataset corresponding to the second seismic signal emitted by the second seismic source, combine the first and second datasets to create a complete dataset covering a survey area, and create a seismic image of a subsurface of the survey area.

In accordance with a further embodiment of the present disclosure, a non-transitory computer-readable medium is disclosed including computer-executable instructions carried on the computer-readable medium. The instructions, when executed, cause the processor to configure a first seismic source located outside of an exclusion zone, configure a second seismic source located inside of the exclusion zone, obtain a first seismic dataset corresponding to a first seismic signal emitted by the first seismic source, obtain a second seismic dataset corresponding to a second seismic signal emitted by the second seismic source, combine the first and second datasets to create a complete dataset covering a survey area, and create a seismic image of a subsurface of the survey area.

BRIEF DESCRIPTION OF THE DRAWINGS

For a more complete understanding of the present disclosure and its features and advantages, reference is now made to the following description, taken in conjunction with the accompanying drawings, in which like reference numbers indicate like features and wherein.

DETAILED DESCRIPTION

Seismic exploration systems use one or more seismic sources to emit a seismic signal. Some seismic exploration areas contain exclusion zones where seismic source emissions may be restricted or limited. In exploration areas containing exclusion zones, the seismic data recorded from the seismic survey may contain data inaccuracies. A seismic image produced from seismic data containing inaccuracies may result in a less accurate image or may result in artifacts in the seismic data. Therefore, according to the teachings of the present disclosure, systems and methods are presented that use multiple seismic acquisition systems to provide complete seismic source coverage in an exploration area to allow for improved data processing and seismic imaging. The use of multiple seismic acquisition systems can allow for greater seismic imaging accuracy and can provide seismic data about subsurface formations in exclusion zones.

Figure 1A:
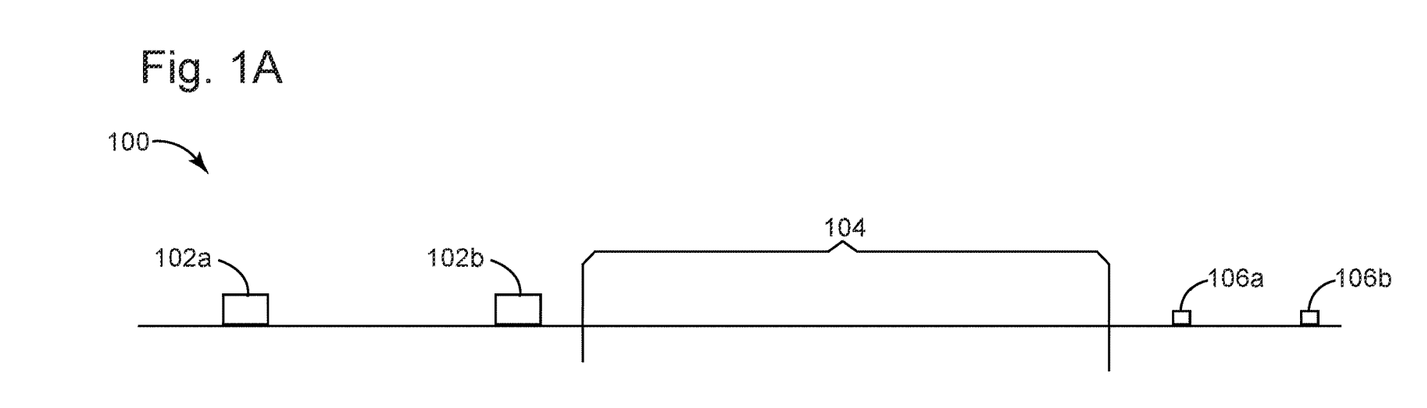
FIGS. 1A and 1B illustrate perspective views of seismic acquisition systems including an exemplary seismic exploration area and exclusion zone in accordance with some embodiments of the present disclosure.
Figure 1B:
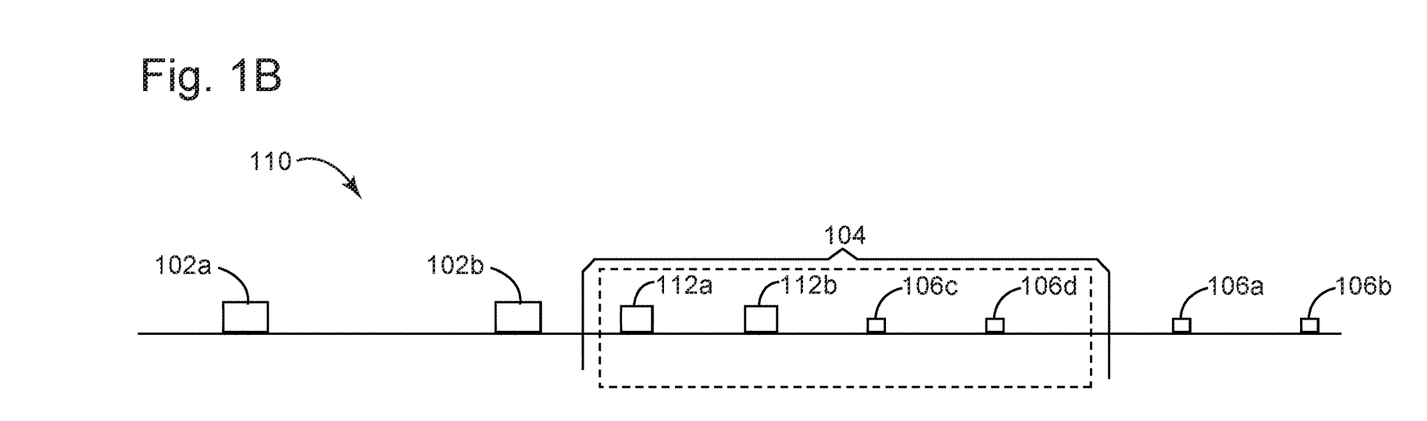

FIGS. 1A and 1B illustrate perspective views of seismic acquisition systems 100 and 110, respectively, including an exemplary seismic exploration area and exclusion zone 104 in accordance with some embodiments of the present disclosure. Seismic sources 102a-102b ("seismic sources 102") emit seismic signals and are components of first seismic acquisition system 100. First seismic acquisition system 100 may include receivers 106a-106b ("receivers 106") that receive portions of the seismic signal reflected from the subsurface formations.

Seismic sources 102 may be any suitable seismic sources, such as impulsive energy sources (such as a mud gun or an air gun), or seismic vibrator sources (such as hydraulic, pneumatic, electric, or magnetostrictive actuators). In some embodiments, the use of seismic sources 102 may be restricted or prohibited in exclusion zone 104. Exclusion zone 104 may be an area in which seismic sources 102 are subject to permitting requirements (for example, wildlife or environmental preserves, industrial areas, or residential areas), are prohibited due to safety concerns (for example, near offshore platforms, floating production, storage, and offloading (FPSO) areas, rigs, or buoys), or are otherwise prohibited or limited. Therefore, gaps may exist in the coverage area of seismic sources 102 due to the presence of exclusion zone 104.

Seismic acquisition practices may use undershooting techniques to mitigate the effect of the gaps in the seismic source coverage. Undershooting involves placing seismic source 102 on one side of exclusion zone 104 and receiver 106 on approximately the opposite side of exclusion zone 104. The seismic signal emitted from seismic source 102 may reflect back from subsurface formations and is received by receiver 106. The signal received by receiver 106 may be processed to create an image of the subsurface. However, seismic data for exclusion zone 104 provided by undershooting techniques may not be as accurate as the seismic data provided if a seismic source is placed in exclusion zone 104. For example, undershooting techniques may not provide information regarding near offsets because seismic source 102 may not be in close proximity to the undershot region (for example, exclusion zone 104). Offset may be the distance between a particular seismic source 102 and a particular receiver 106. Lack of near offset data may limit certain types of analysis of the final seismic imaging data, such as Amplitude Versus Offset (AVO) analysis. AVO analysis may use data from multiple seismic sources 102 and multiple receivers 106, and the respective offsets to determine information about the subsurface formations, such as the fluid content, porosity, density, seismic velocity, shear wave information, fluid indicators, or other suitable information.

Therefore, second seismic acquisition system 110, including seismic sources 112*a*-112*b* ("seismic sources 112") and receivers 106*c*-106*d*, may be placed inside exclusion zones 104, as shown in FIG. 1B. Seismic sources 112 may be any suitable seismic source that may be used in exclusion zone 104, such as a piezoelectric source, an electrodynamic linear motor actuator source, a magnetostrictive actuator, a mass impact source, or any other low power source. A piezoelectric seismic source may be a source that is powered by electricity. A piezoelectric seismic source, equipped with a piezoelectric actuator, may be easily deployed to remote or hard to reach locations and may be used in sensitive areas due to the low environmental impact of the source. Piezoelectric actuators are described in U.S. Pat. No. 7,420,879, incorporated in material part by reference herein. For example, a piezoelectric seismic source may not have a risk of oil spillage or noise related to explosions from impulsive sources or mechanical engines related to vibratory sources. An electrodynamic linear motor actuator source may be a source driven by a moving magnet type actuator and may have similar benefits as a piezoelectric source for use in exclusion zone 104. Electrodynamic linear motor actuators are described in U.S. Pat. No. 8,619,497, incorporated in material part by reference herein.

Seismic sources 112 may have different emission characteristics from seismic sources 102. The different emission characteristics of seismic sources 112 may reduce interference between the seismic signal emitted by seismic sources 102 and seismic sources 112. For example, seismic sources 112 may emit monofrequencies, low energy frequency sweeps, or pseudorandom source signals. Alternative methods may also be possible, such as a sequence of discrete frequencies emitted using a pseudorandom sequence such that instead of emitting a single tone for approximately thirty seconds, different discrete frequencies may be emitted for a shorter time with the frequency stepped through following a pre-determined pseudorandom fashion to create a step frequency sweep. The frequency steps may follow a prescribed pseudorandom sequence.

In some embodiments, seismic sources 112 may emit monofrequencies. Seismic sources 112 may be part of a SEISMOVIE™ system designed and manufactured by CGG Services SA (Massy, France). A SEISMOVIE™ system may emit energy at individual frequencies (for example, monofrequencies), one-by-one, until approximately the entire frequency band of interest is emitted. After seismic source 112 emits the frequency band, data processing techniques can reconstruct broad-band information in the time domain to cover the full spectrum covered by the monofrequencies. Seismic sources 112 may emit each monofrequency at a lower power setting but for a longer period of time than seismic sources 102. For example, a piezoelectric source may emit a signal at two-thousand Newtons of force for sixty seconds or may emit a signal at five-thousand Newtons of force for thirty seconds. A test emission may be performed in exclusion zone 104 to determine how many sources 112 may be used and how long the signal may be emitted to achieve a signal-to-noise ratio that produces data with a usable signal. The monofrequencies emitted by seismic sources 112 may not be detected or received by receivers 106 outside of exclusion area 104 because the monofrequencies emitted by seismic sources 112 may be quickly attenuated. As such, the seismic signals emitted by seismic sources 112 may not appear in seismic data generated by first seismic acquisition system 100. In situations where the monofrequencies emitted by seismic sources 112 are visible in the seismic data generated by receivers 106 located outside of exclusion area 104, a data processing system may correct the seismic data, for example, by filtering and removing the data corresponding to the monofrequencies emitted by seismic sources 112 based on the time at which those monofrequencies are emitted.

In embodiments where seismic sources 112 emit low energy frequency sweeps, seismic sources 112 may emit sweeps of frequencies in the frequency spectrum of interest at a low power setting. The low energy signals emitted by seismic sources 112 may be located at a sufficient distance from receivers 106 located outside of exclusion area 104 such that the low energy signals from seismic sources 112 are attenuated by the time the signals reach receivers 106 located outside of exclusion area 104. Therefore, the effect of second seismic acquisition system 110 on first seismic acquisition system 110 may be minimal. If interference exists between the signal emitted by seismic sources 102 and seismic sources 112, the distance between seismic sources 102 and seismic sources 112 may be increased to reduce the interference. By taking into account the characteristics of both sources 102 and sources 112, a distance to reduce interference may be calculated. For example, one source of interference between seismic 102 and sources 112 may be ground roll. To determine the distance between source 102 and source 112 that may reduce the ground roll interference may be calculated by determining the distance required to attenuate the signal by an amount greater than the signal energy ratio of source 102 and source 112. Additionally, data processing techniques may be used to reduce interference between seismic sources 102 and 112.

In some embodiments, seismic sources 102 may emit a seismic signal simultaneously with seismic sources 112. If there is minimal interference between first seismic acquisition system 100 and second seismic acquisition system 110, both seismic acquisition systems 100 and 110 may be operated simultaneously without stopping or delaying the operation of either seismic acquisition system 100 or 110. Simultaneous operation may reduce the cost of the seismic exploration because first seismic acquisition system 100 may not need to standby while second seismic acquisition system 110 is operating.

In other embodiments, seismic sources 102 may emit a seismic signal at a different time than seismic sources 112. For example, a survey performed using second seismic acquisition system 110 may be performed before, after, or between individual surveys performed using first seismic acquisition system 100. The data recorded by second seismic acquisition system 110 may be used to improve the accuracy of the seismic data recorded by first seismic acquisition system 100. Seismic sources 102 may emit a seismic signal at a different time than seismic sources 112 in situations where interference exists between the signals emitted by seismic sources 102 and the signals emitted by seismic sources 112.

In some embodiments, first seismic acquisition system 100 and second seismic acquisition system 110 may perform seismic surveys for the same purpose. For example, first seismic acquisition system 100 and second seismic acquisition system 110 may image deep reflections from the subsurface. The data recorded by second seismic acquisition system 110 may be used to improve the accuracy of the seismic data recorded by first seismic acquisition system 100 for exclusion zone 104. In other embodiments, second seismic acquisition system 110 may be used for a different purpose than first seismic acquisition system 100. For example, second seismic acquisition system 110 may be used to image the near surface, for higher spatial sampling or increased resolution of the surveys, for analysis of near-surface waves, or for analysis of the first arrival waves for use in near-surface characterization.

First seismic acquisition system 100 and second seismic acquisition system 110 may use receivers 106 from a receiver array for receiving seismic waves reflected from the signals emitted by seismic sources 102 and seismic sources 112. In other embodiments, additional receivers 106 (for example, receivers 106c and 106d) may be added to the receivers array to supplement the array of receivers 106. Receivers 106 may be positioned in multiple configurations, such as linear, grid, array, or any other suitable configuration. Each receiver 106 is typically spaced apart from adjacent receivers 106 on a string or cable. Spacing between receivers 106 on the string or cable may be approximately the same preselected distance, or span, or the spacing may vary depending on a particular application, exploration area topology, or any other suitable parameter. For example, receivers 106 may be placed at a spacing of approximately forty meters between each receiver 106. In other embodiments, receivers 106 may not be regularly spaced. Due to the low power of seismic sources 112, additional receivers 106 may be added in exclusion zone 104 at a spacing of approximately five meters between each receiver 106.

While the example embodiment in FIG. 1 illustrates 2D seismic acquisition systems, the systems and methods described in the present disclosure may be used for 3D and 4D seismic acquisition systems.

Figure 2:
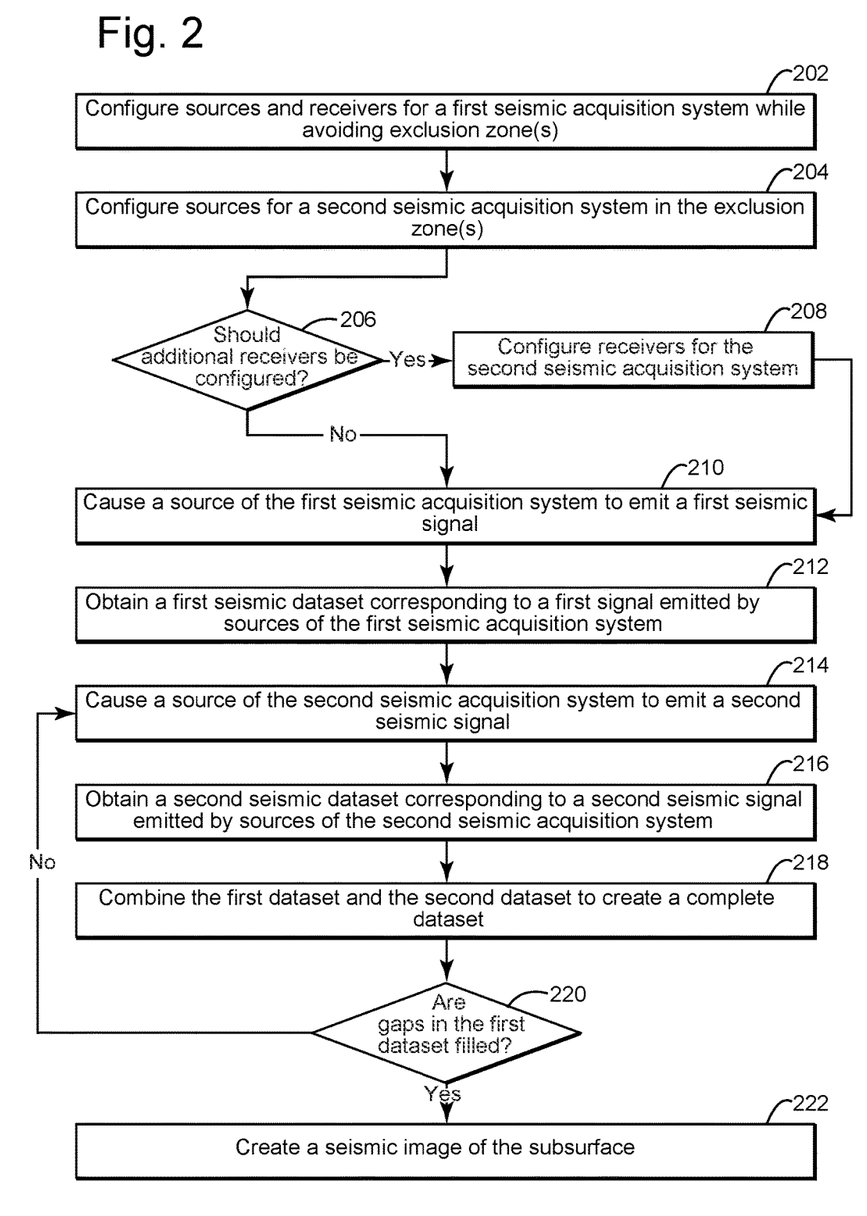
FIG. 2 illustrates a flow chart of an example method for performing a seismic survey using multiple seismic acquisition systems in accordance with some embodiments of the present disclosure.

FIG. 2 illustrates a flow chart of an example method for performing a seismic survey using multiple seismic acquisition systems in accordance with some embodiments of the present disclosure. Using multiple seismic acquisition systems may increase the data accuracy of a subsurface image where high-power seismic sources are excluded in a portion of the seismic survey area. The steps of method 200 can be performed by an engineer or operator, a user, various computer programs, models, or any combination thereof, configured to deploy, operate, simulate, design, and analyze data from seismic exploration signal systems, equipment, or devices. The programs and models may include instructions stored on a computer-readable medium and operable to perform, when executed, one or more of the steps described above. The computer-readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer-readable media. Collectively, the engineer, operator, user, or computer programs and models used to deploy, operate, simulate, design, and analyze data from seismic exploration systems may be referred to as a "seismic exploration entity."

In step 202, the seismic exploration entity configures seismic sources and receivers for a first seismic acquisition system. The seismic sources and receivers may be configured such that no seismic sources and receivers are deployed in one or more exclusion zone(s). For example, first seismic acquisition system 100, discussed with reference to FIG. 1A, may be configured in a seismic survey area. Seismic sources 102 may be operable to emit a seismic signal and may be any suitable seismic sources, such as impulsive energy sources or seismic vibrator sources. The receivers may be operable to receive the seismic waves, emitted by the seismic source, which are reflected from the subsurface formations. The exclusion zone may be an area where use of vibratory or impulsive sources may be limited or restricted, for example may be subject to permitting requirements, may be prohibited due to safety concerns, or may be otherwise prohibited or limited. An example first seismic acquisition system may be shown and discussed in further detail in FIG. 3.

In step 204, the seismic exploration entity configures seismic sources for a second seismic acquisition system in the one or more exclusion zones. The seismic sources of the second seismic acquisition system (for example, seismic sources 112 included in second seismic acquisition system 110 discussed with reference to FIG. 1B) may have different emission characteristics from seismic sources 102 to minimize interference between the seismic signal emitted by the seismic sources configured in step 202 and the seismic sources configured in step 204. For example, the seismic sources configured in step 204 may emit monofrequencies, low energy frequency sweeps, or pseudorandom sweeps while the seismic sources configured in step 202 may emit moderate to high energy frequency sweeps or pseudorandom sweeps. The seismic sources configured in step 204 may be any suitable seismic source that may be used in an exclusion zone, such as a piezoelectric source, a mass impact source, a propane hammer, an encoded pulsed source, or any other low power source. For example, the pulsations from an encoded pulsed source may follow a pseudorandom sequence or the time interval between the pulsations may change monotonically to resemble a sweep. An example second seismic acquisition system may be shown and discussed in further detail in FIG. 4.

In step 206, the seismic exploration entity determines whether additional receivers are necessary proximate to or located in the exclusion zones. Additional receivers may be configured to supplement the array of receivers deployed in step 202 to receive the seismic waves reflected from signals emitted by the seismic sources deployed in the exclusion zones in step 204. In some embodiments, the low power of the seismic sources in the exclusion zone may support the deployment of additional receivers in the exclusion zone or receivers located at a smaller spacing than the receivers deployed in step 202. If additional receivers are not to be deployed, method 200 may proceed to step 210, otherwise method 200 may proceed to step 208.

In step 208, the seismic exploration entity configures additional receivers to support the second seismic acquisition system. The additional receivers may be configured in the exclusion zone or outside of the exclusion zone and may be at a closer spacing than the receivers configured in step 202.

In step 210, the seismic exploration entity causes a seismic source of the first seismic acquisition system to emit a first seismic signal, as configured in step 202. The first seismic signal may be emitted by any number of seismic sources in the first seismic acquisition system and may cover the survey area but may not cover the exclusion zones. Therefore, the coverage area of the first acquisition system seismic sources may have gaps in the exclusion zones.

In step 212, the seismic exploration entity obtains a first seismic dataset recorded by receivers from reflected or refracted seismic waves emitted by the first seismic source. The reflected seismic waves may be received by receivers configured as part of the first seismic acquisition system configured in step 202. The receivers may be spaced at any suitable separation distance between receivers, such as approximately forty meters. The recorded first seismic dataset may cover the survey area but may have inaccuracies in the first seismic dataset corresponding to the exclusion zones.

In step 214, the seismic exploration entity causes a seismic source of the second seismic acquisition system to emit a second seismic signal, as configured in step 204. The second seismic signal may be used to produce data covering the exclusion zone where the data produced by the first seismic acquisition system may have inaccuracies. The second seismic signal may be emitted simultaneously with the first seismic signal when the second seismic signal is a monofrequency or a low power seismic sweep that minimally interferes with the first seismic signal. In other embodiments, the second seismic signal may be emitted at a different time than the first seismic signal. For example, the second seismic signal may be emitted before or after the first seismic signal. Additionally, the second seismic signal may be emitted between repeated emissions of the first seismic signal.

In step 216, the seismic exploration entity obtains a second seismic dataset recorded by receivers from reflected seismic waves emitted by the second seismic source. The reflected seismic waves may be received by receivers configured in step 202 and by receivers configured in step 208.

In step 218, the seismic exploration entity combines the second dataset with the first dataset to create a complete dataset. The second dataset may be combined using data processing techniques to fill the gaps in the coverage of the first seismic exploration system corresponding to the exclusion zones. For example, the second dataset may be processed to regularize the dataset for combination with the first dataset. The regularization process may include converting the second dataset into the time domain and performing an equalization process such that the resultant wavelets have the same signature for at least the frequencies emitted by both first and second sources. The equalization process may include signature deconvolution based on the ground force estimates for first and second sources. Additionally, in embodiments where the spatial sampling varies between the first and second sources, spatial interpolation may be performed. Data processing may also be used to reconstruct broad-band information in the time domain to cover the full spectrum covered by the monofrequencies emitted as the second seismic signal in step 214 or may be used to remove interference between the first seismic signal and the second seismic signal when the first seismic signal and the second seismic signal are emitted simultaneously.

In step 220, the seismic exploration entity determines whether there are other inaccuracies in the first dataset to be filled by the second dataset. Additional inaccuracies may exist due to additional exclusion zones. If additional inaccuracies exist, method 200 may return in step 214. Otherwise method 200 may proceed to step 222 to create a seismic image of the subsurface.

Modifications, additions, or omissions may be made to method 200 without departing from the scope of the present disclosure. The order of the steps may be performed in a different manner than that described and some steps may be performed at the same time. For example, step 214 may be performed before, after, or simultaneously with step 212. Additionally, each individual step may include additional steps without departing from the scope of the present disclosure. For example, if steps 210 and 214 are performed simultaneously, the signals may be encoded such that the signals emitted by each seismic acquisition system may be separately identified and the signals received by the receivers may be a superposition of the contribution of each source. The first and second seismic datasets obtained in steps 212 and 216 may be obtained by separating the contributions from the first and second seismic acquisition systems. The separation process may involve spectral filtering, averaging, a cross-correlation process, or any other suitable form of coherency filtering. Further, more steps may be added or steps may be removed without departing from the scope of the disclosure.

Figure 3:
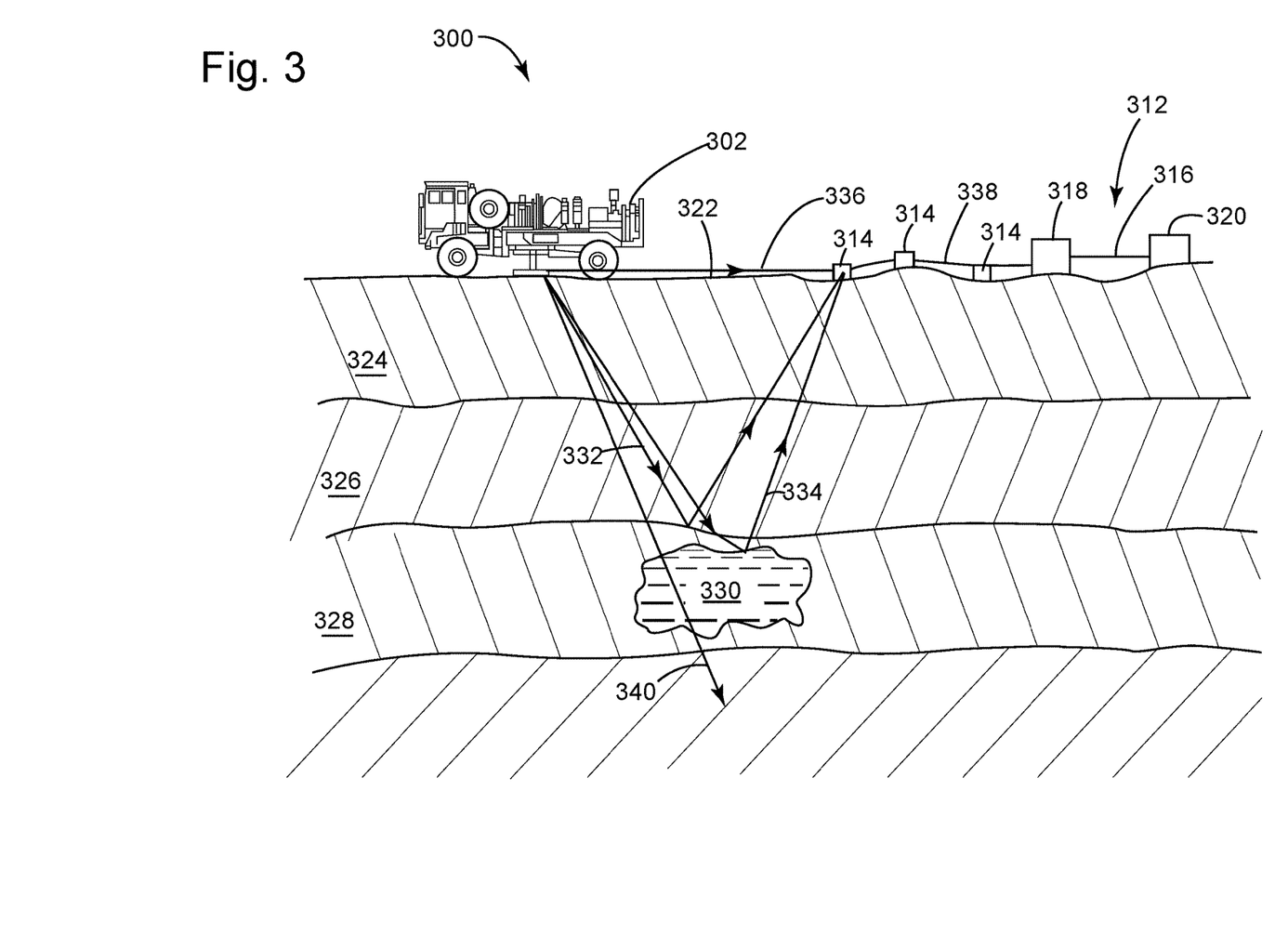
FIGS. 3 and 4 illustrate elevation views of example seismic exploration systems configured to produce images of the earth's subsurface geological structure in accordance with some embodiments of the present disclosure.

The method described with reference to FIG. 2 is used to enhance the effectiveness of a system used to emit seismic signals, receive reflected signals, and process the resulting data to image the earth's subsurface. FIG. 3 illustrates an elevation view of an example seismic exploration system 300 configured to produce images of the earth's subsurface geological structure in accordance with some embodiments of the present disclosure. The images produced by system 300 allow for the evaluation of subsurface geology. System 300 may include one or more seismic energy sources 302 and one or more receivers 314 which are located within a pre-determined exploration area. The exploration area may be any defined area selected for seismic survey or exploration. Survey of the exploration area may include the activation of seismic source 302 that radiates an acoustic wave field that expands downwardly through the layers beneath the earth's surface. The seismic wave field is then partially reflected or refracted from the respective layers as a wave front recorded by receivers 314. For example, seismic source 302 generates seismic waves and receivers 314 record seismic waves 332 and 334 reflected from interfaces between subsurface layers 324, 326, and 328, oil and gas reservoirs, such as target reservoir 330, or other subsurface structures. Subsurface layers 324, 326, and 328 may have various densities, thicknesses, or other characteristics. Target reservoir 330 may be separated from surface 322 by multiple layers 324, 326, and 328. As the embodiment depicted in FIG. 3 is exemplary only, there may be more or fewer layers 324, 326, or 328 or target reservoirs 330. Similarly, there may be more or fewer seismic waves 332 and 334. Additionally, some seismic source waves will not be reflected, as illustrated by seismic wave 340. In addition, in some cases other waves (not expressly shown) may be present that may be useful in imaging a formation or for computing seismic attributes such as refracted waves or mode converted waves.

Seismic energy source 302 may be referred to as an acoustic source, seismic source, energy source, and source 302. In some embodiments, seismic source 302 is located on or proximate to surface 322 of the earth within an exploration area. A particular seismic source 302 may be spaced apart from other similar seismic sources. Seismic source 302 may be operated by a central controller that coordinates the operation of several seismic sources 302. Further, a positioning system, such as a global positioning system (GPS), may be utilized to locate and time-correlate seismic sources 302 and receivers 314. Multiple seismic sources 302 may be used to improve data collection efficiency, provide greater azimuthal diversity, improve the signal to noise ratio, and improve spatial sampling. The use of multiple seismic sources 302 can also input a stronger signal into the ground than a single, independent seismic source 302. Seismic sources 302 may also have different capabilities and the use of multiple seismic sources 302 may allow for some seismic sources 302 to be used at lower frequencies in the spectrum and other seismic sources 302 at higher frequencies in the spectrum.

Seismic source 302 may comprise any type of seismic device that generates controlled seismic energy used to perform reflection or refraction seismic surveys, such as a seismic vibrator, vibroseis, dynamite, an air gun, a thumper truck, or any other suitable seismic energy source. In some embodiments, seismic source 302 may be a piezoelectric source, a propane hammer, an encoded pulsed source, or other similar system, such as SEISMOVIE™, designed to generate a monofrequency. For example, the seismic signal emitted in step 210 as described in FIG. 2 may be emitted by seismic source 302. In other embodiments, seismic source 302 may emit pseudorandom source signals where individual frequencies are emitted in a pseudorandom pattern. In further embodiments, seismic source 302 may be a swept impulsive source and may emit pulsations at changing time intervals to resemble a sweep.

Seismic source 302 may radiate varying frequencies or one or more monofrequencies of seismic energy into surface 322 and subsurface formations during a defined interval of time. Seismic source 302 may impart energy through a sweep of multiple frequencies or at a single monofrequency, or through a combination of at least one sweep and at least one monofrequency or through the use of pseudorandom sweeps. A signal may be discontinuous so that seismic source 302 does not generate particular frequencies between the starting and stopping frequency and receivers 314 do not receive or report data at the particular frequencies.

Seismic exploration system 300 may include monitoring device 312 that operates to record reflected energy seismic waves 332, 334, and 336. Monitoring device 312 may include one or more receivers 314, network 316, recording unit 318, and processing unit 320. In some embodiments, monitoring device 312 may be located remotely from seismic source 302.

Receiver 314 may be located on or proximate to surface 322 of the earth within an exploration area. Receiver 314 may be any type of instrument that is operable to transform seismic energy or vibrations into a signal compatible with the data acquisition system, for example a voltage signal, a current signal, or an optical signal. For example, receiver 314 may be a vertical, horizontal, or multicomponent geophone, accelerometers, or optical fiber or distributed acoustic sensor (DAS) with wire or wireless data transmission, such as a three component (3C) geophone, a 3C accelerometer, hydrophone, or a 3C Digital Sensor Unit (DSU). Multiple receivers 314 may be utilized within an exploration area to provide data related to multiple locations and distances from seismic sources 302. Receivers 314 may be positioned in multiple configurations, such as linear, grid, array, or any other suitable configuration. In some embodiments, receivers 314 may be positioned along one or more strings 338. Each receiver 314 is typically spaced apart from adjacent receivers 314 in the string 338. Spacing between receivers 314 in string 338 may be approximately the same preselected distance, or span, or the spacing may vary depending on a particular application, exploration area topology, or any other suitable parameter.

One or more receivers 314 transmit raw seismic data from reflected seismic energy via network 316 to recording unit 318. Recording unit 318 transmits raw seismic data to processing unit 320 via network 316. Processing unit 320 performs seismic data processing on the raw seismic data to prepare the data for interpretation. For example, processing unit 320 may perform the data processing techniques described in steps 218 and 222 in FIG. 2. Although discussed separately, recording unit 318 and processing unit 320 may be configured as separate units or as a single unit. Recording unit 318 or processing unit 320 may include any equipment or combination of equipment operable to compute, classify, process, transmit, receive, store, display, record, or utilize any form of information, intelligence, or data. Recording unit 318 may record the reflected seismic waves from the first and second seismic attribution system, as described with respect to steps 212 and 214 of FIG. 2. For example, recording unit 318 and processing unit 320 may include one or more personal computers, storage devices, servers, or any other suitable device and may vary in size, shape, performance, functionality, and price. Recording unit 318 and processing unit 320 may include random access memory (RAM), one or more processing resources, such as a central processing unit (CPU) or hardware or software control logic, or other types of volatile or non-volatile memory. Additional components of recording unit 318 and processing unit 320 may include one or more disk drives, one or more network ports for communicating with external devices, one or more input/output (I/O) devices, such as a keyboard, a mouse, or a video display. Recording unit 318 or processing unit 320 may be located in a station truck or any other suitable enclosure.

Network 316 may be configured to communicatively couple one or more components of monitoring device 312 with any other component of monitoring device 312. For example, network 316 may communicatively couple receivers 314 with recording unit 318 and processing unit 320. Further, network 314 may communicatively couple a particular receiver 314 with other receivers 314. Network 314 may be any type of network that provides communication, such as one or more of a wireless network, a local area network (LAN), or a wide area network (WAN), such as the Internet. For example, network 314 may provide for communication of reflected energy and noise energy from receivers 314 to recording unit 318 and processing unit 320.

The seismic survey conducted using seismic source 302 may be repeated at various time intervals to determine changes in target reservoir 330. The time intervals may be months or years apart. Data may be collected and organized based on offset distances, such as the distance between a particular seismic source 302 and a particular receiver 314 and the amount of time it takes for seismic waves 332 and 334 from a seismic source 302 to reach a particular receiver 314. Data collected during a survey by receivers 314 may be reflected in traces that may be gathered, processed, and utilized to generate a model of the subsurface structure or variations of the structure, for example 4D monitoring.

Figure 4:
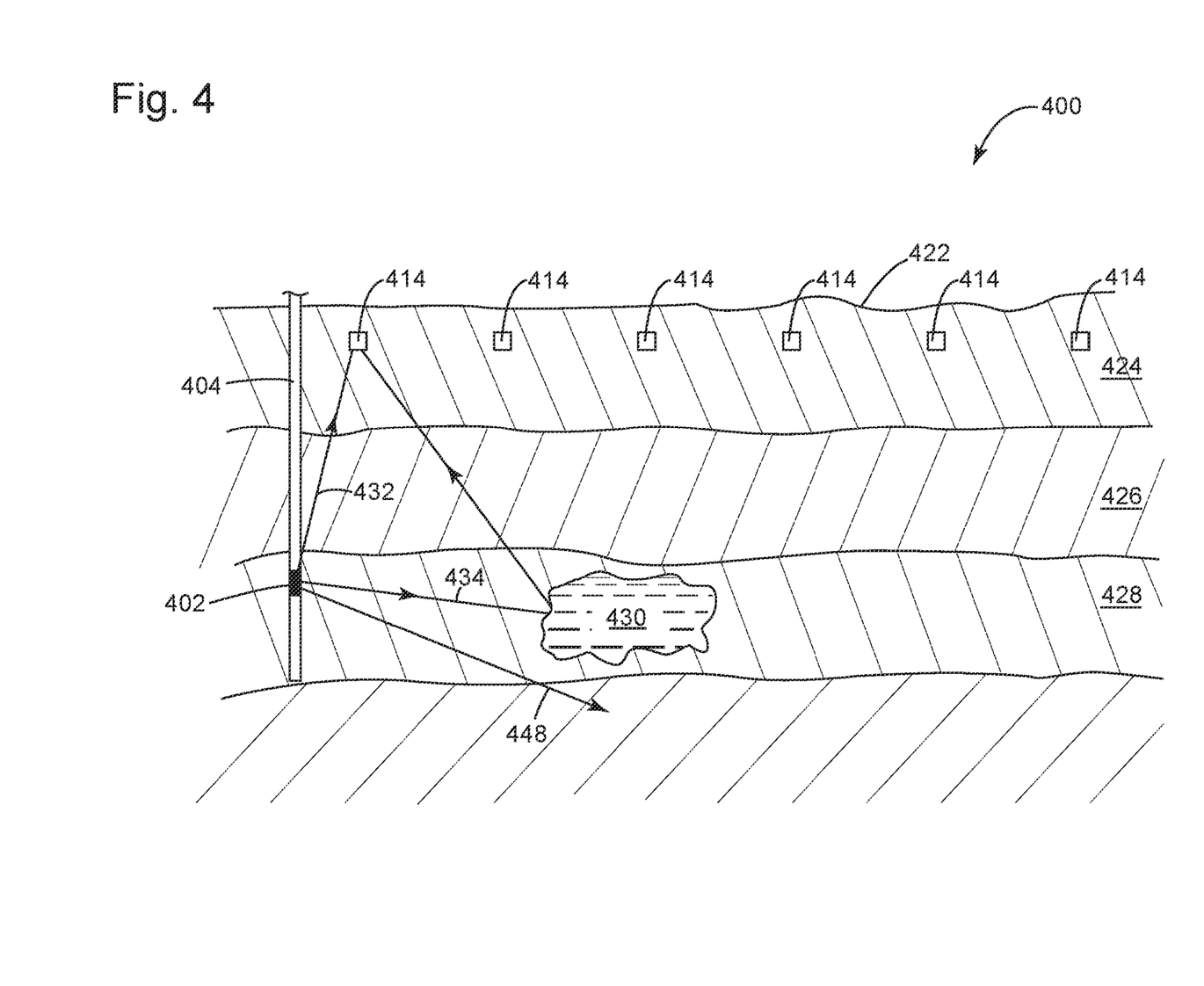

As an example of a second seismic exploration system, FIG. 4 illustrates an elevation view of an example seismic exploration system 400 configured to produce images of the earth's subsurface geological structure in accordance with some embodiments of the present disclosure. Seismic system 400 includes seismic source 402 that may be provided in well 404. Seismic source 402 may be any known seismic source. For example, seismic source 402 may be a SEISMOVIE™ source that may include piezoelectric vibrator elements that provide a wide bandwidth and high reliability/repeatability. Seismic source 402 may radiate an acoustic wave field that expands through the layers beneath the earth's surface. For example, seismic source 402 generates seismic waves and receivers 414 record seismic waves 432 and 434 reflected by interfaces between subsurface layers 424, 426, and 428, oil and gas reservoirs, such as target reservoir 430, or other subsurface structures. As the embodiment depicted in FIG. 4 is exemplary only, there may be more or fewer layers 424, 426, or 428 or target reservoirs 430. Similarly, there may be more or fewer seismic waves 432 and 434. Additionally, some seismic source waves will not be reflected, as illustrated by seismic wave 440. While seismic source 402 is shown in FIG. 4 as being in well 404, seismic source 402 may be installed in surface 422.

One or more receivers 414 may be buried at a predetermined depth relative to the surface of the earth 422 or may be placed on the surface of the earth 422. The predetermined depth may be a distance larger than zero and smaller than the depth of reservoir 430, for example, predetermined depth may be approximately twelve meters. Receiver 414 may be any type of instrument that is operable to transform seismic energy or vibrations into a voltage signal. For example, receiver 414 may be a vertical, horizontal, or multicomponent geophone, accelerometers, or optical fiber or distributed acoustic sensor (DAS) with wire or wireless data transmission, such as a three component (3C) geophone, a 3C accelerometer, hydrophone, or a 3C Digital Sensor Unit (DSU).

In one embodiment, system 400 may include hundreds of receivers 414 and tens of seismic sources 402 configured to continuously emitting seismic waves. Seismic sources 402 may be provided in well 404 (or multiple wells 404) at a depth, for example approximately eighty meters. The data may be generated for over a period of days, weeks, or months. One or more receivers 414 may transmit raw seismic data from reflected seismic energy via a network to a recording unit, as described with reference to FIG. 3. The recording unit may transmit raw seismic data to a processing unit via a network. The processing unit may perform seismic data processing on the raw seismic data to prepare the data for interpretation. System 400 may be similar to second seismic acquisition system 110 as shown in FIG. 1B.

Although discussed with reference to a land implementation, embodiments of the present disclosure are also useful in transition zone and marine applications. In a transition zone application, seismic sources 302 or 402 may be include magnetostrictive actuators. In a marine application, monitoring device 312 or monitoring device 412 may include hydrophones or accelerometers contained inside buoyant streamers, which may be towed behind a vessel. Seismic sources 302 or 402 and monitoring device 312 or 412 may be towed behind the same or a different vessel or may be suspended from platforms or buoys in the water. Embodiments of the present disclosure may also be used in a seabed acquisition application. In a seabed acquisition application, where receiver 314 or 414 is placed on the seabed, monitoring device 312 or 412 may include 3C geophone and hydrophones.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. For example, the emitted signals described in FIGS. 1A and 1B by seismic sources 102 and seismic sources 112 may be any combination of seismic sweeps and monofrequencies. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, a receiver does not have to be turned on but may be configured to receive reflected energy.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. The computer processor may serve as a signal generator as described in method 200 in FIG. 2.

Embodiments of the present disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium or any type of media suitable for storing electronic instructions, and coupled to a computer system bus. Furthermore, any computing systems referred to in the specification may include a single processor or may be architectures employing multiple processor designs for increased computing capability. For example, the signal generator described in method 200 with respect to FIG. 2 may be stored in tangible computer-readable storage media.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate. Instead, the scope of the present disclosure is defined by the appended claims.

What is claimed is:

1. A method of seismic exploration, comprising:
    configuring a first seismic source located outside of an exclusion zone inside which using the first seismic source is restricted or limited;
    configuring a second seismic source located inside of the exclusion zone, wherein using the second seismic source inside the exclusion zone is permitted;
    obtaining a first seismic dataset recorded by first receivers and corresponding to a first seismic signal emitted by the first seismic source;
    obtaining a second seismic dataset recorded by second receivers and corresponding to a second seismic signal emitted by the second seismic source;
    combining the first and second datasets to create a complete dataset covering a survey area including the exclusion zone; and
    creating a seismic image of a subsurface of the survey area based on the complete dataset.

2. The method of claim 1, wherein the second seismic signal is a monofrequency.

3. The method of claim 1, wherein the second seismic signal is a low energy frequency sweep.

4. The method of claim 1, wherein the first seismic signal and the second seismic signal are emitted simultaneously.

5. The method of claim 1, wherein the second seismic source is an electrically driven source.

6. The method of claim 5, wherein the second seismic source is at least one of piezoelectric actuator, a magnetostrictive actuator, or an electrodynamic linear motor actuator.

7. The method of claim 1, wherein both the first dataset and the second dataset are recorded by first receivers.

8. The method of claim 1, wherein the second receivers have a different receiver spacing from the first receivers.

9. A seismic exploration system, comprising:
a first seismic source configured to emit a first seismic signal, the first seismic source located outside of an exclusion zone inside which using the first seismic source is restricted or limited;
a second seismic source configured to emit a second seismic signal, the second seismic source located inside the exclusion zone, wherein using the second seismic source inside the exclusion zone is permitted;
first receivers and second receivers configured to detect seismic signals emitted by the first and the second seismic source, respectively; and
a data processing system configured to:
obtain a first seismic dataset recorded by the first receivers and corresponding to the first seismic signal emitted by the first seismic source;
obtain a second seismic dataset recorded by the second receivers and corresponding to the second seismic signal emitted by the second seismic source;
combine the first and second datasets to create a complete dataset covering a survey area including the exclusion zone; and
create a seismic image of a subsurface of the survey area based on the complete dataset.

10. The seismic exploration system of claim 9, wherein the second seismic signal is at least one monofrequency.

11. The seismic exploration system of claim 9, wherein the second seismic signal is a low energy frequency sweep.

12. The seismic exploration system of claim 9, wherein the first seismic signal and the second seismic signal are emitted simultaneously.

13. The seismic exploration system of claim 9, wherein the second seismic source is an electrically driven source.

14. The seismic exploration system of claim 9, wherein both the first dataset and the second dataset are recoded by first receivers.

15. The seismic exploration system of claim 9, wherein the second receivers have a different receiver spacing from the first receivers.

16. A non-transitory computer-readable medium, comprising: computer-executable instructions carried on the computer-readable medium, the instructions, when executed, causing a processor to:
configure a first seismic source located outside of an exclusion zone inside which using the first seismic source is restricted or limited;
configure a second seismic source located inside of the exclusion zone, wherein using the second seismic source inside the exclusion zone is permitted;
obtain a first seismic dataset recorded by first receivers and corresponding to a first seismic signal emitted by the first seismic source;
obtain a second seismic dataset recorded by second receivers and corresponding to a second seismic signal emitted by the second seismic source;
combine the first and second datasets to create a complete dataset covering a survey area including the exclusion zone; and
create a seismic image of a subsurface of the survey area based on the complete dataset.

17. The non-transitory computer-readable medium of claim 16, wherein the second seismic signal is a monofrequency.

18. The non-transitory computer-readable medium of claim 16, wherein the second seismic signal is a low energy frequency sweep.

19. The non-transitory computer-readable medium of claim 16, wherein the first seismic signal and the second seismic signal are emitted simultaneously.

20. The non-transitory computer-readable medium of claim 16, wherein the second seismic source is an electrically driven source.

* * * * *